(12) United States Patent
Wilson

(10) Patent No.: US 10,724,742 B2
(45) Date of Patent: Jul. 28, 2020

(54) COOKING APPLIANCE GRAPHICAL COOKING PROFILES

(71) Applicant: Midea Group Co., Ltd., Beijiao (CN)

(72) Inventor: Mark W. Wilson, Louisville, KY (US)

(73) Assignee: MIDEA GROUP CO., LTD., Beijiao, Shunde, Foshan, Guangdong (CN)

( * ) Notice: Subject to any disclaimer, the term of this patent is extended or adjusted under 35 U.S.C. 154(b) by 367 days.

(21) Appl. No.: 15/637,912

(22) Filed: Jun. 29, 2017

(65) Prior Publication Data
US 2019/0003719 A1    Jan. 3, 2019

(51) Int. Cl.
*H05B 1/02* (2006.01)
*F24C 7/08* (2006.01)
*G05D 23/19* (2006.01)

(52) U.S. Cl.
CPC .............. *F24C 7/086* (2013.01); *F24C 7/082* (2013.01); *G05D 23/1917* (2013.01)

(58) Field of Classification Search
CPC ..... F24C 7/082; H05B 1/0266; H05B 1/0258; H05B 1/0261; H05B 1/02; H05B 3/0076
USPC .............................. 219/494, 506, 445.1, 412
See application file for complete search history.

(56) References Cited

U.S. PATENT DOCUMENTS

| | | | |
|---|---|---|---|
| 5,790,437 A | 8/1998 | Schuh et al. | |
| 6,933,477 B2 | 8/2005 | Becker et al. | |
| 8,730,038 B2 | 5/2014 | Durian | |
| 9,191,998 B2 | 11/2015 | Hegedis et al. | |
| 9,439,530 B2 | 9/2016 | Logan et al. | |
| 2005/0218139 A1 | 10/2005 | Cavada et al. | |
| 2009/0025704 A1 | 1/2009 | Padula | |
| 2012/0180775 A1 | 7/2012 | Waltz et al. | |
| 2012/0288595 A1 | 11/2012 | Randall et al. | |
| 2014/0101619 A1 | 4/2014 | Kaldor | |
| 2015/0064314 A1 | 3/2015 | Manuel et al. | |
| 2016/0051078 A1 | 2/2016 | Jenkins et al. | |
| 2016/0058230 A1 | 3/2016 | Choueiri et al. | |
| 2016/0220059 A1 | 8/2016 | Wachtler et al. | |
| 2016/0235239 A1 | 8/2016 | Patadia | |
| 2019/0234617 A1* | 8/2019 | Bhogal | F24C 7/087 |

FOREIGN PATENT DOCUMENTS

| | | |
|---|---|---|
| CN | 103343993 A | 10/2013 |
| CN | 105659029 A | 6/2016 |
| EP | 2840319 A1 | 2/2015 |
| GB | 2506907 B | 1/2016 |
| WO | WO2015124883 | 8/2015 |
| WO | WO2015135788 | 9/2015 |
| WO | WO2015179904 | 12/2015 |

OTHER PUBLICATIONS

Stoker User Manual Software, Ver 2.7w Software.
International Search Report and Writtien Opinion issued in Application No. PCT/CN2018/078746 dated Jun. 21, 2018.

* cited by examiner

*Primary Examiner* — Mark H Paschall
(74) *Attorney, Agent, or Firm* — Middleton Reutlinger

(57) ABSTRACT

Graphical cooking profiles may be used to control a cooking appliance such as an oven, stovetop, range, grill or the like by varying applied cooking energy in the cooking appliance over the course of a cooking cycle.

36 Claims, 9 Drawing Sheets

COOKING APPLIANCE GRAPHICAL COOKING PROFILES

BACKGROUND

Cooking today is in many respects as much an art as a science, and care must often be taken during cooking to ensure that food is neither overcooked nor undercooked, which often requires constant monitoring of a cooking appliance, e.g., a range, stovetop, oven, or the like. Cooking fundamentally involves applying cooking energy to food, e.g., through the application of heat, and it has been found that the rate at which energy is applied to food, as well as the duration, can have an appreciable effect on taste, texture and other physical properties of the food.

The Maillard reaction, for example, is a chemical reaction between amino acids and reducing sugars that occurs in browned foods such as breads, meats, and pastries, among other foods, and that imparts a distinct and pleasing flavor to many such foods. The Maillard reaction occurs relatively quickly under high heat of around 140 to 165 degrees Celsius, and for many foods proceeds rapidly under continued heating to caramelization and/or charring. The Maillard reaction may in particular be prevalent as a result of cooking foods at a high heat, e.g., when broiling in an oven, searing in a pan, or cooking on a grill, etc. Cooking at high heat, however, can also lead to uneven cooking of thicker foods, potentially leading to foods being undercooked in the center and yet overcooked and dried out or burnt on the outside. Conversely, cooking food for a longer duration but at a lower temperature can provide more even cooking throughout the food, but often at the expense of taste if the temperatures required for the Maillard reaction are not achieved. In many cases therefore a combination of temperatures may be used, e.g., by cooking food at a lower temperature for some time period and then finishing by increasing the temperature for a short period of time. Other foods, such as egg-based dishes such as soufflés, meringues, and the like, undergo significant physical changes during cooking and are highly sensitive to the rate at which heat is applied during the cooking process, and thus may also be challenging to prepare properly. Such techniques, however, often are performed manually by a cook, and rely on the cook's expertise and prior experience to ensure that both the rate of applied energy and the duration of cooking at different rates are suitable for the food being prepared. For less experienced cooks, however, these techniques may be difficult to implement manually, and can lead to undesirable results. Further, even with an experienced cook, any distraction at a critical moment of the cooking process, e.g., when the cook is busy preparing other food, washing dishes, watching television, etc., can also lead to undesirable results.

Accordingly, a need continues to exist in the art for a manner of controlling a cooking appliance such as a stovetop, oven, range, grill, etc. to provide greater control, consistency and repeatability of cooking than can be achieved manually.

SUMMARY

The herein-described embodiments address these and other problems associated with the art by providing graphical cooking profiles for use in controlling a cooking appliance such as an oven, stovetop, range, grill or the like by varying applied cooking energy in the cooking appliance over a cooking cycle.

Consistent with one aspect of the invention, a method of controlling a cooking appliance may include, in response to tracing user input received by a user input device, creating a graphical cooking profile that varies applied cooking energy in the cooking appliance over a cooking cycle, and causing a display to display a graphical representation of the graphical cooking profile in a time-energy graph display that includes a first axis corresponding to energy and a second axis corresponding to time.

Some embodiments may also include causing the cooking appliance to initiate the cooking cycle and vary the cooking energy applied by the cooking appliance over the cooking cycle according to the cooking profile. In addition, some embodiments may further include progressively overlaying a sensed temperature of the cooking appliance onto the time-energy graph display during the cooking cycle. Also, in some embodiments, the display and the user input device are defined by a touch-sensitive display disposed on a control panel of the cooking appliance. Further, in some embodiments, the display and the user input device are defined by a touch-sensitive display disposed on a computing device separate from the cooking appliance, and in some embodiments, the computing device includes a mobile device wirelessly networked with the cooking appliance.

In some embodiments, the cooking appliance includes an oven, a range, a stovetop, or a grill. In addition, in some embodiments, the tracing user input traces a line onto the display. In some embodiments, causing the display to display the graphical representation of the graphical cooking profile includes progressively drawing the graphical representation of the graphical cooking profile in response to the tracing user input. In some embodiments, creating the graphical cooking profile includes applying curve fitting and/or applying one or more drawing constraints to generate one or more line segments for the traced line, and in some embodiments, the one or more line segments includes a linear line segment and/or a curved line segment.

In addition, in some embodiments, creating the graphical cooking profile includes creating a plurality of events for the graphical cooking profile, each event including a time value and an energy value corresponding to a portion of the traced line. In addition, in some embodiments causing the display to display the graphical representation of the graphical cooking profile further includes displaying a time value and an energy value corresponding to a location of a current touch input on the time-energy graph display. Some embodiments may also include receiving user input that selects a location on the time-energy graph display, and adding an event to the graphical cooking profile in response to the user input that selects the location, where the event includes a time value and an energy value corresponding to the selected location on the time-energy graph display, and causing the display to display the graphical representation of the graphical cooking profile includes displaying a user control corresponding to the event on the time-energy graph display.

Some embodiments may also include, in response to user input that drags the user control to a different location, updating the time value and/or the energy value for the event to correspond to the different location. Moreover, in some embodiments, the first axis of the time-energy graph display is a substantially vertical axis and the second axis of the time-energy graph display is a substantially horizontal axis. In some embodiments, the first axis represents temperature or power level. In some embodiments, the graphical representation of the graphical cooking profile includes a line graph or a bar graph. In addition, some embodiments may also include adjusting a scale of one of the first and second axes in response to user input, and modifying the graphical cooking profile based upon the adjusted scale.

Some embodiments may also include storing the graphical cooking profile in a database, retrieving the graphical cooking profile in response to future user input, and initiating execution of a cooking cycle using the retrieved graphical cooking profile. Moreover, in some embodiments, the tracing user input and the future user input are received from the same user, and where initiating the cooking cycle includes initiating the cooking cycle on the cooking appliance.

Also, in some embodiments, the future user input is received from a different user than from which the tracing user input is received, and initiating the cooking cycle includes initiating the cooking cycle on a different cooking appliance. Some embodiments may also include retrieving one or more previously-created graphical cooking profiles meeting a criterion, and displaying display representations of the one or more previously-created graphical cooking profiles on the display, where retrieving the graphical cooking profile is performed in response to user selection of a display representation of the graphical cooking profile on the display.

In addition, in some embodiments, the criterion is based on a food to be cooked such that the one or more previously-created graphical cooking profiles are associated with the food to be cooked. In addition, some embodiments may further include automatically detecting the food to be cooked. Moreover, in some embodiments, the criterion is based on an identity of a user of the cooking appliance. Further, in some embodiments, the user input device is an image capture device, and the tracing user input includes a gesture. Also, in some embodiments, the user input device is an audio input device, and the tracing user input includes voice input.

Consistent with another aspect of the invention, a residential cooking appliance may include a housing, a cooking element configured to heat food disposed on a stovetop or in a cooking cavity enclosed by the housing, a touch-sensitive display disposed on the housing, and a controller coupled to the cooking element and the touch-sensitive display. The controller is configured to cause the touch-sensitive display to display a graph display that includes a substantially vertical axis corresponding to temperature or power level and a substantially horizontal axis corresponding to time, receive user input directed to the touch-sensitive display that traces a line onto the graph display, in response to the user input, progressively draw the traced line onto the graph display, and in response to the user input, create a graphical cooking profile that varies applied cooking energy in the residential oven over a cooking cycle based at least in part upon the traced line.

Consistent with yet another aspect of the invention, an apparatus may include a user input device, a display, at least one processor coupled to the user input device to receive user input from the user input device and output display information to the display, and program code configured upon execution by the at least one processor to create, in response to tracing user input received by the user input device, a graphical cooking profile that varies applied cooking energy in a cooking appliance over a cooking cycle, and cause the display to display a graphical representation of the graphical cooking profile in a time-energy graph display that includes a first axis corresponding to energy and a second axis corresponding to time.

Also, in some embodiments, the display and the user input device are defined by a touch-sensitive display disposed on a control panel of the cooking appliance. Further, in some embodiments, the display and the user input device are defined by a touch-sensitive display disposed on a computing device separate from the cooking appliance.

Consistent with another aspect of the invention, a program product may include a non-transitory computer readable medium, and program code stored on the non-transitory computer readable medium and configured upon executed by at least one processor to control a cooking appliance by, in response to tracing user input received by a user input device, creating a graphical cooking profile that varies applied cooking energy in the cooking appliance over a cooking cycle, and causing a display to display a graphical representation of the graphical cooking profile in a time-energy graph display that includes a first axis corresponding to energy and a second axis corresponding to time.

Consistent with another aspect of the invention, a method of controlling a cooking appliance may include in response to user input received by a touch-sensitive display, creating a graphical profile that varies applied cooking energy in the cooking appliance over a cooking cycle, and causing the touch-sensitive display to display a graphical representation of the graphical cooking profile in a time-energy graph display that includes a first axis corresponding to energy and a second axis corresponding to time.

Further, in some embodiments, the user input selects a location on the time-energy graph display, creating the graphical cooking profile includes adding an event to the graphical cooking profile in response to the user input that selects the location, the event includes a time value and an energy value corresponding to the selected location on the time-energy graph display, and causing the touch-sensitive display to display the graphical representation of the graphical cooking profile includes displaying a user control corresponding to the event on the time-energy graph display. Some embodiments may also include, in response to user input that drags the user control to a different location, updating the time value and/or the energy value for the event to correspond to the different location.

Consistent with yet another aspect of the invention, a method of controlling a cooking appliance may include causing a touch-sensitive display to display a graphical representation of a graphical cooking profile that varies applied cooking energy in the cooking appliance over a cooking cycle in a time-energy graph display that includes a first axis corresponding to energy and a second axis corresponding to time, in response to user input received by the touch-sensitive display, modifying the graphical cooking profile, and causing the touch-sensitive display to display an updated graphical representation of the graphical cooking profile in the time-energy graph display.

In some embodiments, causing the touch-sensitive display to display the graphical representation of the graphical cooking profile includes causing the touch-sensitive display to display a user control corresponding to an event of the graphical cooking profile on the time-energy graph display, and the user input includes user input that drags the user control to a different location, and modifying the graphical cooking profile includes updating a time value and/or an energy value for the event.

Also, in some embodiments, the graphical cooking profile is a base graphical cooking profile associated with a food. Some embodiments may also include automatically detecting the food, where causing the touch-sensitive display to display the graphical representation is performed in response to automatically detecting the food.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
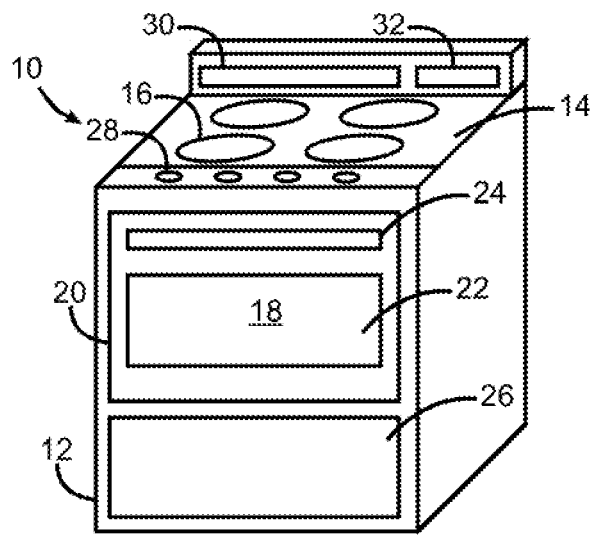
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of burners 16, and an oven 18 defining a cooking cavity accessed via an oven door 20 having a window 22 and a handle 24. Cooking appliance 10 may also include a storage drawer 26 in some embodiments, or in other embodiments, may include a second oven. Various cooking elements (not shown in FIG. 1) may also be incorporated into cooking appliance 10 for cooking food in oven 18, e.g., one or more electric or gas heating elements.

Cooking appliance 10 may also include various user interface devices, including, for example, control knobs 28 for controlling burners 16, a control panel 30 for controlling oven 18 and/or burners 16, and a display 32 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 32 may be touch sensitive to receive user input in addition to displaying status information and/or otherwise interacting with a user. In still other embodiments, cooking appliance 10 may be controllable remotely, e.g., via a smartphone, tablet, personal digital assistant or other networked computing device, e.g., using a web interface or a dedicated app.

Display 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 is a range, which combines both a stovetop and one or more ovens, and which in some embodiments may be a standalone or drop-in type of range. In other embodiments, however, cooking appliance 10 may be another type of cooking appliance, e.g., a wall mount or freestanding oven, a drop-in stovetop, etc. In general, a cooking appliance consistent with the invention may be considered to include any residential-type appliance including a housing and one or more cooking elements disposed thereon and/or therein and configured to generate energy for cooking food.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave heating elements in some embodiments, while in the case of a stovetop, one or more cooking elements therein may be gas, electric, or inductive heating elements in some embodiments. Further, it will be appreciated that any number of cooking elements may be provided in a cooking appliance, and that multiple types of cooking elements may be combined in some embodiments, e.g., combinations of microwave and light cooking elements in some oven embodiments.

A cooking appliance consistent with the invention also generally includes one or more controllers configured to control the cooking elements and otherwise perform cooking operations at the direction of a user. In addition, as will become more apparent below, a controller of a cooking appliance in some embodiments may also be configured to create, store, retrieve and/or otherwise utilize graphical cooking profiles in connection with cooking food with the cooking element(s) controlled thereby.

Figure 2:
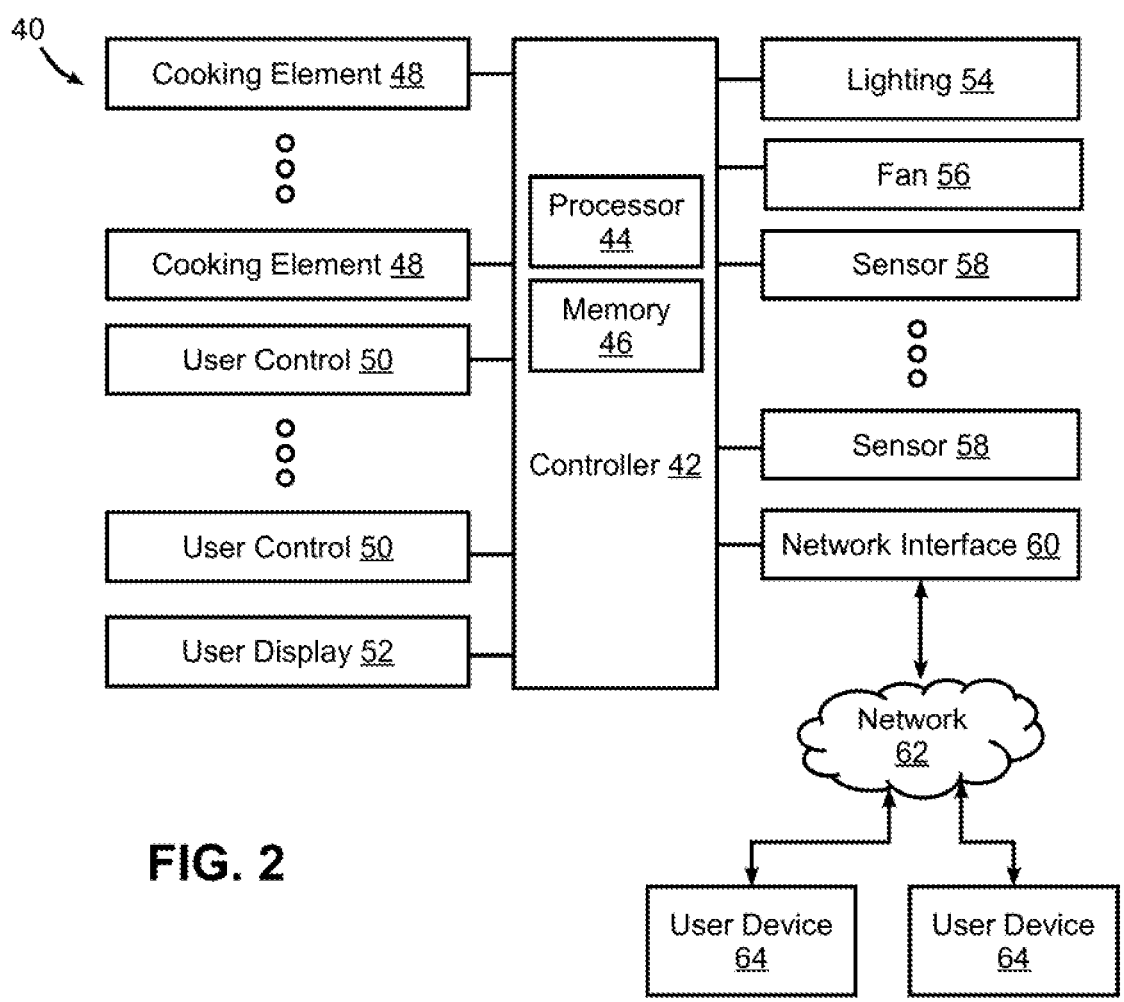
FIG. 2 is a block diagram of an example control system for a cooking appliance consistent with some embodiments of the invention.

FIG. 2, for example, illustrates an example embodiment of a cooking appliance 40 including a controller 42 that receives inputs from a number of components and drives a number of components in response thereto. Cooking appliance 40 may be implemented using practically any type of cooking appliance, e.g., a range, stovetop, single oven, double oven, wall oven, standalone oven, countertop oven, microwave oven, toaster oven, quick-cook oven, etc. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used.

In some embodiments, cooking appliance 40 may be interfaced with one or more user devices 64 over network 62, e.g., computers, tablets, smart phones, wearable devices, etc., and through which cooking appliance 40 may be controlled and/or cooking appliance 40 may provide user feedback. A user device 64, for example, may be configured to perform various operations with graphical cooking profiles, e.g., create graphical cooking profiles, modify graphical cooking profiles, manage stored graphical cooking profiles, activate graphical cooking profiles, share graphical cooking profiles, search for graphical cooking profiles, etc.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Embodiments consistent with the invention, as mentioned above, are directed in part to the use of graphical cooking profiles to facilitate the control of a cooking appliance. A graphical cooking profile consistent with the invention may be considered to be a type of program that controls the operation of a cooking appliance over a cooking cycle by varying applying cooking energy in the cooking appliance during the standpoint in a predetermined manner. A graphical cooking profile is graphical from the standpoint that it represents the program graphically, generally based upon applied cooking energy over the course of the cooking cycle. A graphical representation may include, for example, a line graph, a bar graph, or another type of graphical representation capable of representing applied cooking energy at different points over the course of a cooking cycle.

Applied cooking energy may be represented in a number of manners, e.g., temperatures, wattages, currents, percentages of maximum energy, etc., as may be appropriate for a particular type of cooking appliance or cooking element utilized thereby. Applied cooking energy may also be represented using a power level (e.g., 0 to 10, 0 to 20, Low to High, etc.) or some other indirect representation of applied energy. The applied cooking energy over the course of a cooking cycle may also be considered to be applied cooking energy over time, although the temporal relationship of differing applied energy need not be based on absolute times (e.g., "at 5:30 pm") or durations (e.g., "after 30 minutes"). A graphical cooking profile in some embodiments, for example, may base changes in applied energy on one or more sensor inputs or other conditions, e.g., to change the power level based upon a temperature probe measurement of the food being cooked.

In some embodiments, a graphical cooking profile may be defined as a series of events, with each event defining an energy value representative of applied energy (e.g., a power level or temperature setpoint) as well as a condition for triggering the event. A condition may be based on absolute time or duration in some embodiments, while in other embodiments a condition may be based on one or more sensor inputs, either in lieu of or in addition to an absolute time or duration. Moreover, the condition may be associated with changing an applied energy at a particular time (e.g., to change the power level of a stovetop burner 30 minutes into a cooking cycle), or alternatively, to reach a predetermined applied energy at a particular time (e.g., to change the power level so that the internal temperature of an oven reaches a predetermined value at 30 minutes into a cooking cycle). It will therefore be appreciated that while an event may be associated with a particular point in time, an event-driven change in the control of a cooking cycle may occur prior to reaching that particular point in time.

In this regard, an event may be used in some embodiments to determine a cooking element actuation profile for use in actuating one or more cooking elements to meet an applied energy value specified by an event. A cooking element actuation profile, in particular, defines how one or more cooking elements should be controlled in order to achieve a desired applied energy value. In some instances, a cooking element actuation profile may be determinable in advance of a cooking cycle, e.g., if an event merely specifies a power level at a particular time, or if it can be determined from known heating characteristics and thermal loads in a cooking appliance when and at what level of applied energy a cooking element should be driven in order to reach a desired temperature at a particular point in time. In other instances, however, a cooking element actuation profile may only be determined during a cooking cycle, e.g., to vary the applied energy and/or timing of a cooking element based upon the current temperature in an oven, or the rate of change of temperature in an oven (since the thermal load in an oven may vary depending upon what type and/or quantity of food is in an oven). A cooking element actuation profile may simply set a cooking element to a single power level in some instances, while in other instances, a more complex profile may be used, e.g., to vary the power level over time and based on a monitored temperature to ensure that a desired temperature is reached at a particular time. As one example, an event might specify that temperature is to be increased at a constant rate from a last setpoint of 250 degrees to 450 degrees over 17 minutes.

Furthermore, a graphical cooking profile in some embodiments may be associated with multiple cooking elements and may define different events for different cooking elements to provide a more complex cooking cycle. For example, in a wall oven a graphical cooking profile may separately control a primary cooking element and a broiler cooking element to actuate each at different times in a cooking cycle, while in a quick-cook oven a graphical cooking profile may separately control a microwave cooking element and a light cooking element.

Figure 3:
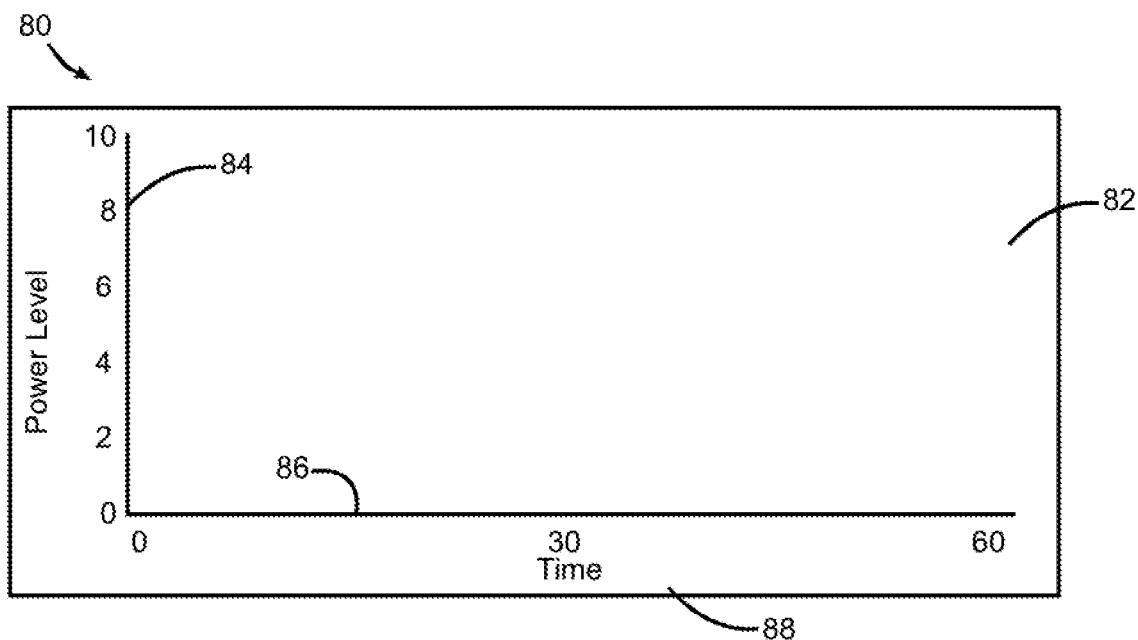
FIG. 3 is a block diagram of a display including an example time-energy graph display, and suitable for creating and displaying a graphical cooking profile in a manner consistent with some embodiments of the invention.

Now turning to FIG. 3, in some embodiments a graphical cooking profile may be created by a user through interaction with a graphical display such as display 80. In the illustrated embodiment, display 80 may be a touch-sensitive display or touchscreen disposed on a cooking appliance, or alternatively a touch-sensitive display or touchscreen on a user device such as a smartphone or tablet networked with a cooking appliance. Display 80 includes a time-energy graph 82 including a first axis 84 corresponding to energy and a second axis 86 corresponding to time. As illustrated, first axis 84 is substantially vertical and second axis 86 is substantially horizontal, although other arrangements of axes may be used in other embodiments. A legend 88 may also be displayed label each axis 84, 86, and it may be seen that first axis 84 in this embodiment corresponds to a power level between 0 and 10, while second axis 86 corresponds to a time between 0 and 60 minutes.

Figure 4A:
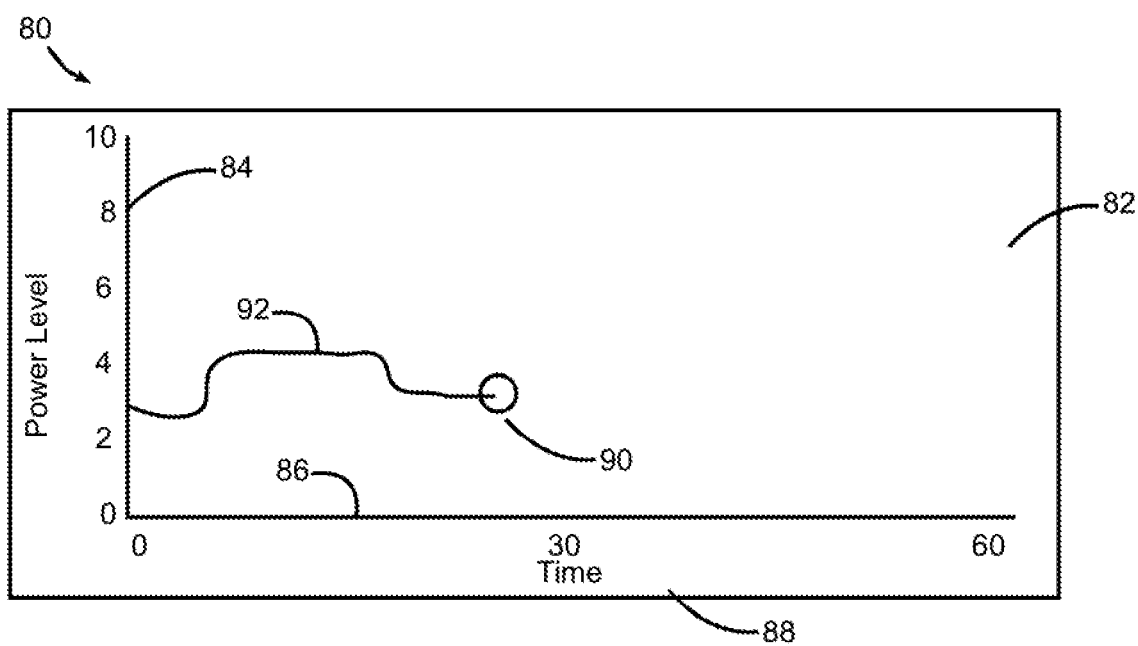
FIGS. 4A-4C illustrate an example graphical cooking profile creation operation performed using the display of FIG. 3.
Figure 4B:
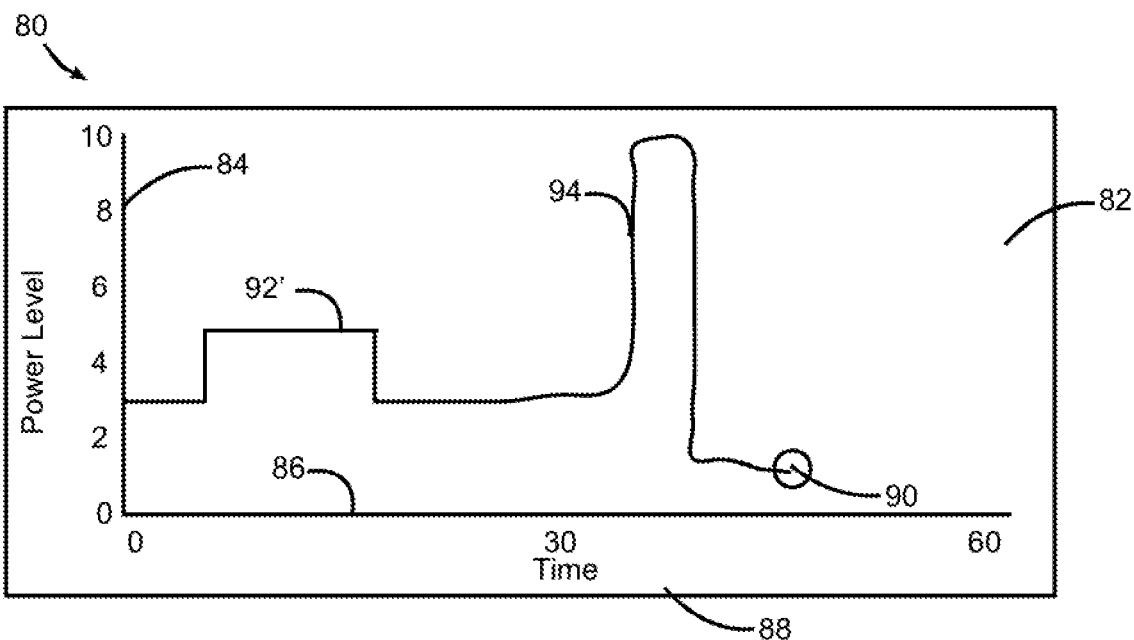
Figure 4C:
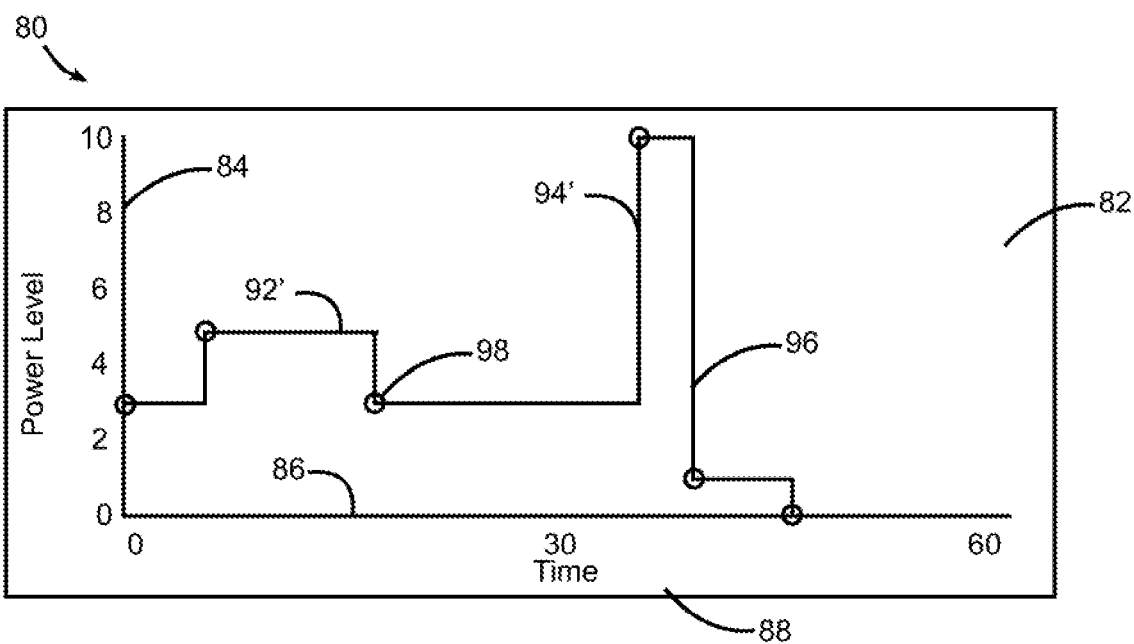

FIGS. 4A-4C next illustrate an example creation operation for creating a graphical cooking profile using display 80, and further based upon tracing user input provided by a user. In this regard, a tracing user input may be considered to be any user input provided by a user that attempts to "trace" a line on a time-energy graph that represents a varying applied cooking energy over at least a portion of a cooking cycle. In some embodiments, the tracing user input may be made through dragging a finger or stylus on display 80 such that a pointer, e.g., pointer 90 of FIG. 4A, follows a desired profile, which is represented by progressively drawing a line 92 to follow the position of the finger or stylus. In other embodiments, however, other forms of input may be employed as tracing user input. For example, a mouse, trackball, touchpad, or the like may be used to trace line 92 on display 80 in some embodiments, while in other embodiments, gestures sensed by an image capture device, or audio commands or other voice input sensed by an audio input device such as a microphone, may be used to effectively trace line 92 on display 80.

FIG. 4A illustrates tracing of only a portion of a graphical cooking profile (represented by line 92), while FIG. 4B illustrates continued tracing of a second portion of the graphical cooking profile represented by line 94. As is also illustrated in FIG. 4B, various image processing techniques may be applied to generate a graphical cooking profile from the tracing user input. FIG. 4B in particular illustrates of curve-fitting and drawing constraints on line 92 during the tracing of line 94, resulting in the modified line 92' formed of multiple distinct line segments. In this example operation, power levels are limited to integer values, and as such, the vertical positions of modified line 92' are constrained to their closest integer values, and moreover, the transitions between different power levels are replaced with vertical linear line segments such that changes between power levels occur immediately during a cooking cycle. In other embodiments, however, other curve-fitting and/or drawing constraints may be applied to generate various combinations of linear and/or curved line segments that approximate a traced line, as well as to generate less abrupt changes between applied energy levels in a graphical cooking profile.

FIG. 4C next illustrates completing the creation of a graphical cooking profile, represented by graphical representation 96. In this figure, line 94 has also been curve-fit and/or constrained to generate a modified line 94', with modified lines 92' and 94' cooperatively defining the graphical cooking profile. Moreover, at this time events may be generated to define the graphical cooking profile, and in some embodiments, user controls such as controls 98 may be overlaid onto display 80 to represent these events. Each event in this example includes an energy value representing a change in applied energy (power level) for a cooking element (represented by axis 84) and a time value representing a specific duration (represented by axis 86) during a cooking cycle.

Figure 5A:
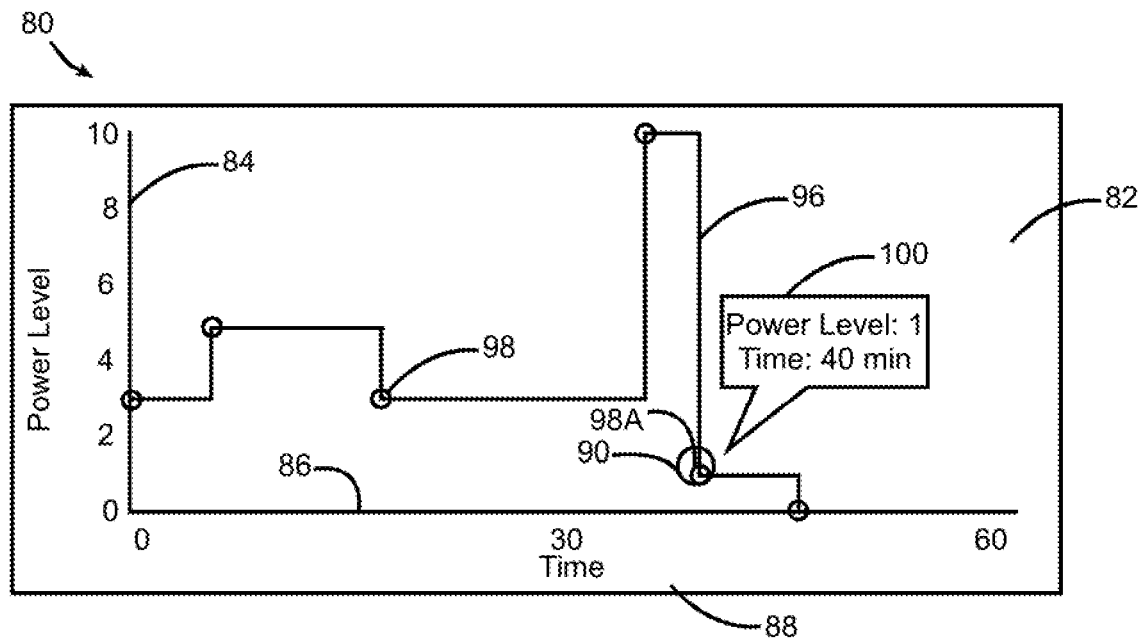
FIGS. 5A-5C illustrate example editing operations performed on the graphical cooking profile created in FIGS. 4A-4C.
Figure 5B:
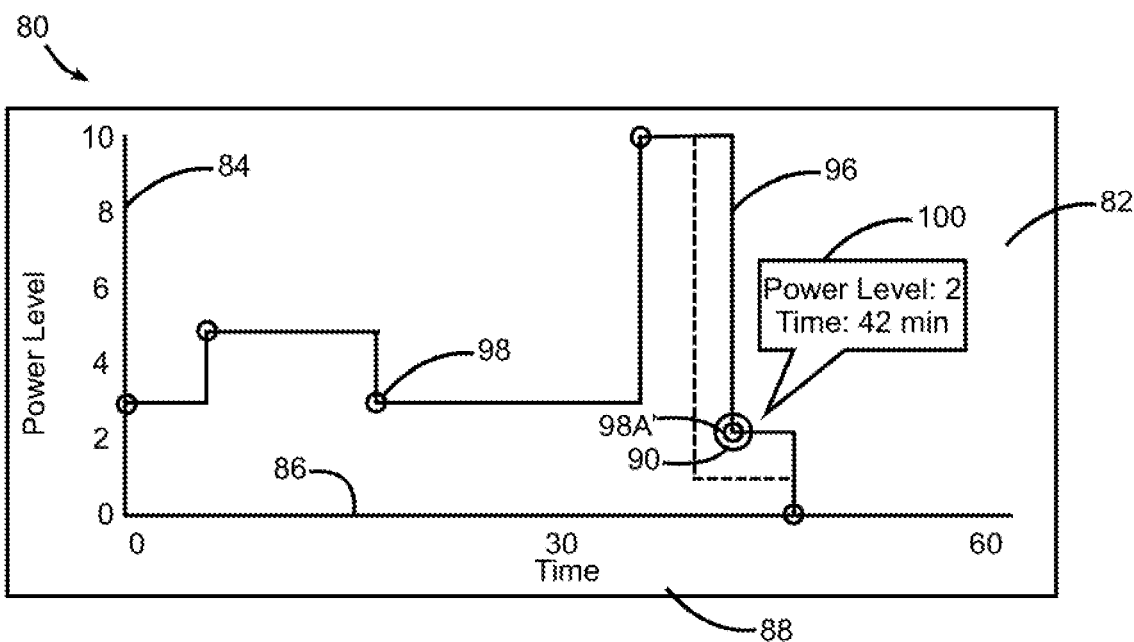
Figure 5C:
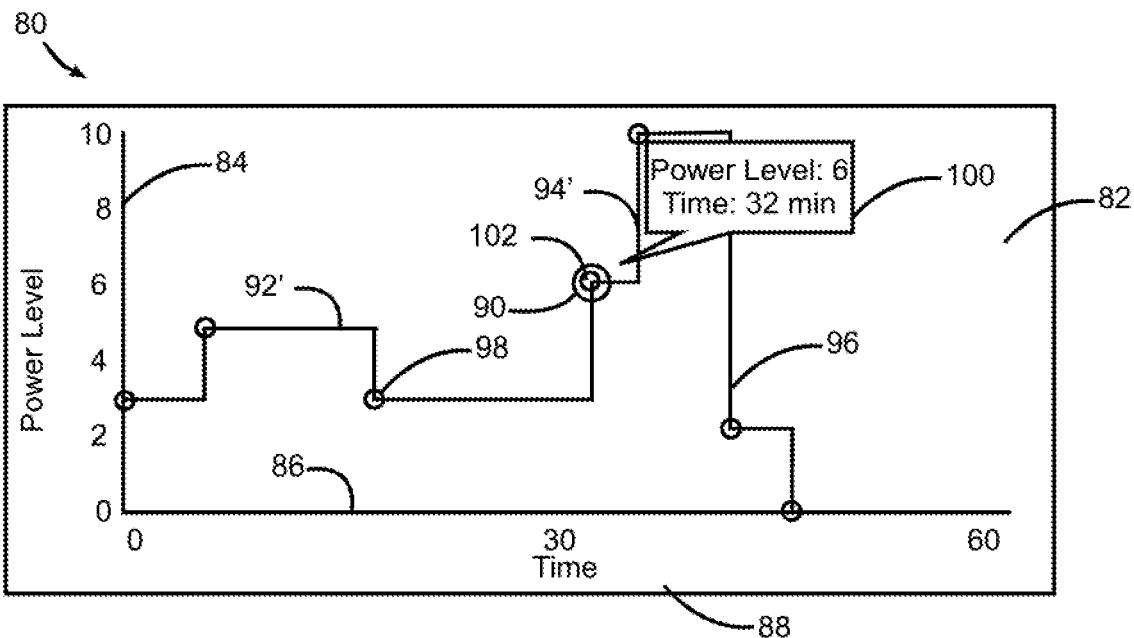

FIGS. 5A-5C next illustrate various editing operations that may be performed subsequent to creation of a graphical cooking profile, e.g., to modify the graphical cooking profile, and by extension, update a graphical representation of the graphical cooking profile displayed on a display. FIG. 5A, for example, illustrates user selection of an event, e.g., by touching control 98A or otherwise positioning pointer 90 over the control, a user operation referred to herein as touch user input. Selection of control 98A may result in a display of the values associated with the selected event in a pop-up display element 100. For the event corresponding to control 98A, for example, the event is associated with a power level of 1 and a duration of 40 minutes. It will be appreciated that a similar pop-up display element or other textual information may be displayed during the initial tracing of a graphical cooking profile so that a user can discern the applied energy and times being selected during a tracing operation.

FIG. 5B illustrates an event modification, e.g., in response to dragging control 98A to a different location indicated at 98A', or using another suitable gesture. In this example, the new location corresponds to a power level of 2 and a time of 42 minutes, and accordingly pop-up display element 100 is updated during and after the drag operation.

FIG. 5C illustrates an event addition, e.g., in response to a long touch on display 80, or another suitable gesture In this example, a long touch at the illustrated position of pointer 90 generates a new event as well as an associated control 102, modifying graphical cooking profile 96 accordingly. As shown by the update to pop-up display element 100, the new event includes an energy value of 6 and a time value of 32 minutes.

It will be appreciated that addition modifications to a graphical cooking profile may be supported in other embodiments, e.g., for deleting events, for renaming profiles, for recategorizing profiles, etc. In addition, other modifications to time-energy graph 82 may be supported, e.g., to support resizing one or more axes. In addition, in connection with resizing an axis, one or more events of a graphical cooking profile may modified accordingly. Thus, for example, should a user desire to change a profile created with a maximum 60 minute duration, scaling graph 82 to display a 120 minute duration on second axis 86 may result in doubling the time values of each of the events in the profile. Alternatively, scaling of graph 82 may simply rescale the display such that the events of the graphical cooking profile remain unchanged. Other types of editing or modification operations suitable for manipulating a graphical cooking profile will be appreciated by those of ordinary skill having the benefit of the instant disclosure.

Figure 6:
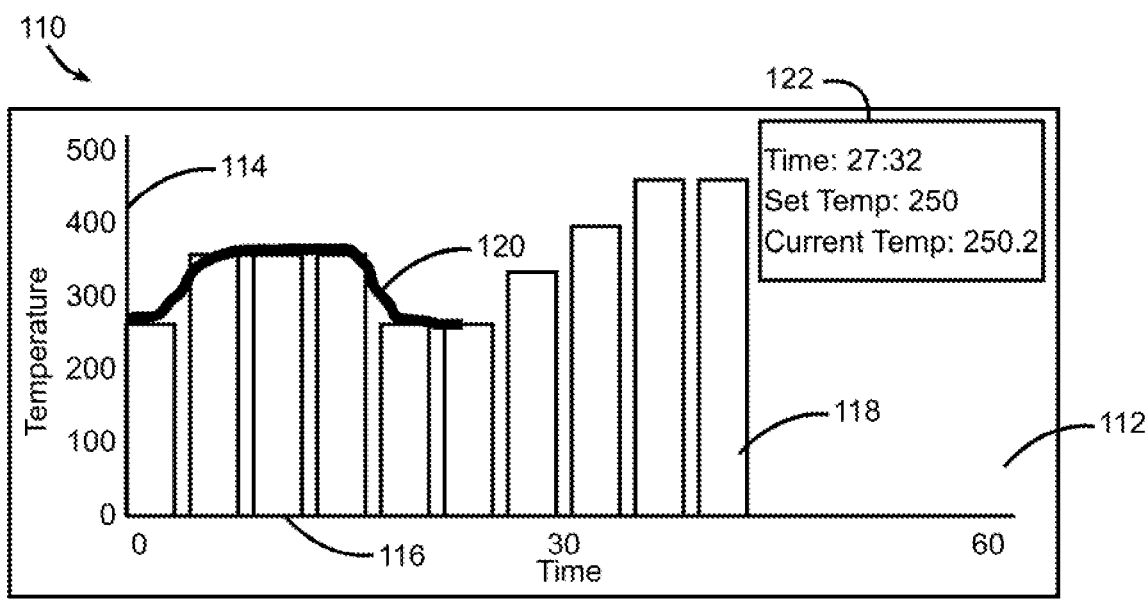
FIG. 6 illustrates an execution operation performed for another example graphical cooking profile on the display of FIG. 3.

Now turning to FIG. 6, this figure illustrates another display 110 including a time-energy graph 112 having a first axis 114 that represents applied energy as a temperature setpoint for a cooking element, here a temperature range of 0 to 500 degrees Fahrenheit, and a second axis 116 representing time. Display 110 also illustrates another suitable manner for displaying a graphical representation of a graphical cooking profile 118, here depicted as a bar graph. It will be appreciated that other graphical representations may be envisioned for other embodiments, and thus the line and bar graphs illustrated herein are not exclusive.

FIG. 6 further illustrates display 110 in the middle of a cooking cycle based on graphical cooking profile 118. In some embodiments, it may be desirable progressively overlay a sensed temperature of the cooking appliance (e.g., sensed by one or more temperature sensors) onto time-energy graph 112 during the cooking cycle, e.g., as illustrated by line 120, thereby enabling a user to view the progress of a cooking cycle as well as the adherence to the selected graphical cooking profile. Further, it may be desirable to display additional textual information on display 110 in some embodiments, e.g., current cooking time, set temperature and current temperature in display element 122.

Figure 7:
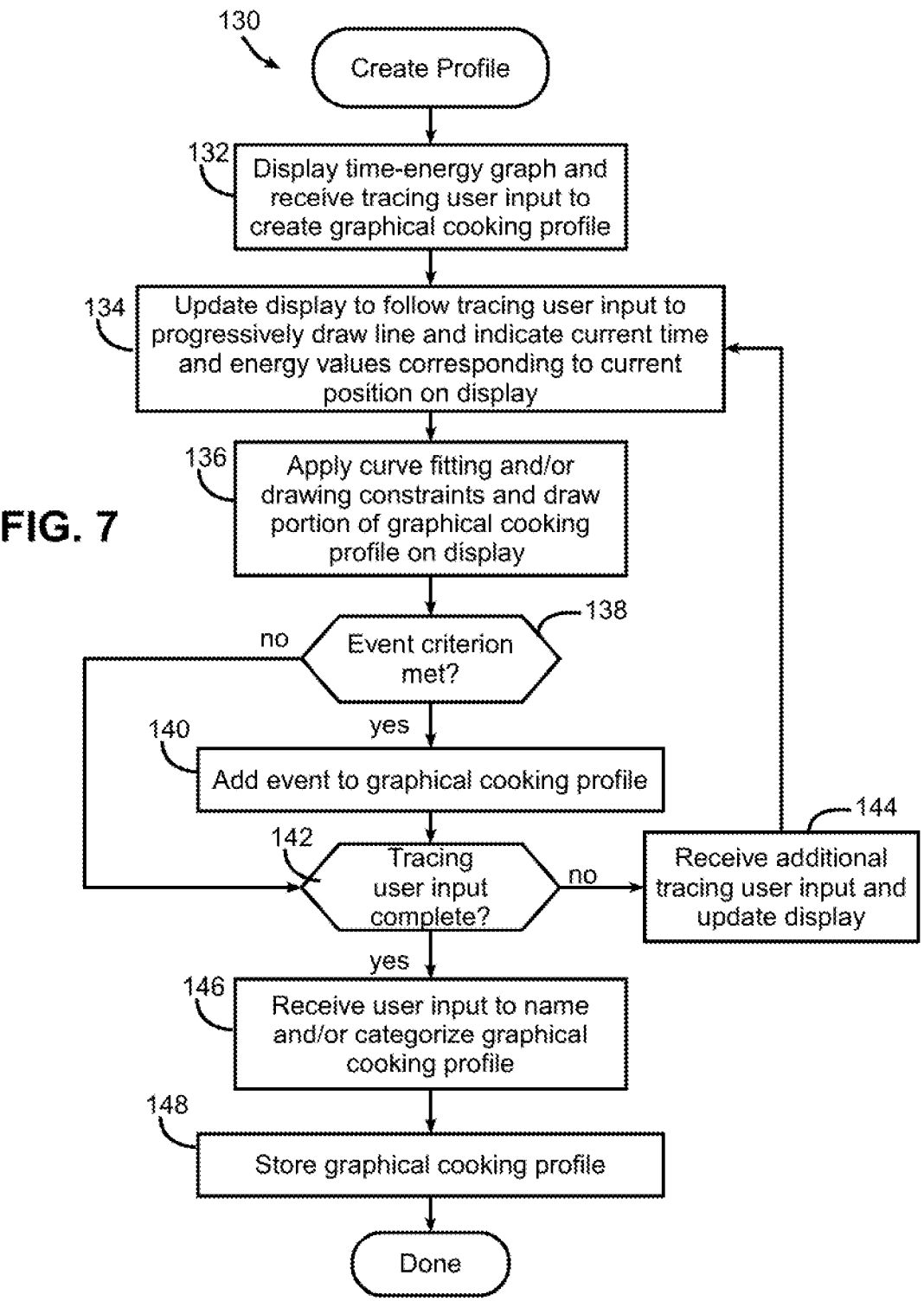
FIG. 7 is a flowchart illustrating an example sequence of operations for creating a graphical cooking profile using the cooking appliance of FIG. 2.

Now turning to FIGS. 7-10, various sequences of operations are illustrated for creating, editing, executing and searching for graphical cooking profiles using a cooking appliance such as cooking appliance 40, e.g., executed on controller 42 and/or a user device coupled thereto. FIG. 7, for example, illustrates a sequence of operations 130 for creating a graphical cooking profile. Sequence 130 may be called, for example, in response to user selection of a menu option on a touch-sensitive display, selection of a hard button, or in another suitable manner whenever a user desires to create a new graphical cooking profile.

Sequence 130 begins in block 132 by displaying a blank time-entry graph as illustrated in FIG. 3, and then receiving tracing user input to create a graphical cooking profile. As noted above, the tracing user input may take a variety of forms, including dragging a finger or stylus on a touch-sensitive display, moving a mouse or other pointing device, gesturing to an image capture device or speaking voice input to an audio input device, among others. Next, in block 134, the display is updated based upon the tracing user input to progressively draw a line on the display corresponding to a line traced by a user. Furthermore, in some embodiments, current time and energy values corresponding to a current pointer position on the display may be displayed to provide a user with further feedback during tracing. Next, block 136 applies curve fitting and/or drawing constraints to the drawn line to smooth out the line and otherwise convert the line into a more usable profile, e.g., by snapping line segments to integer values of a power level, to generate a substantially constant slope during transitions between different applied energy levels, etc.

Block 138 next determines if an event criterion is met, and if so, passes control to block 140 to add an event to the graphical cooking profile being created. Different criteria may be used to designate an event, e.g., a significant change in slope of a traced line, the introduction of a sharp corner in a traced line, and in other suitable manners. In contrast, user input that traces a straight line segment with a constant slope may not be indicative of an event, so in such situations, block 138 may bypass block 140.

Regardless of whether block 140 is executed or bypassed, however, control then passes to block 142 to determine whether the tracing user input is complete. In some embodiments, for example, a tracing user input may be complete when the user lifts a finger or stylus from a touch-sensitive display or otherwise indicates that the tracing is complete. If not complete, block 142 passes control to block 144 to receive additional tracing user input, and then back to block 134 to further update the display to follow the traced line. Once complete, however, block 142 passes control to block 146 to receive user input to name and/or categorize the newly-created graphical cooking profile, and then to block 148 to store the graphical cooking profile, e.g., within a local or remote database, whereby sequence 130 is complete. It will be appreciated that graphical cooking profiles may be named as well as tagged with particular foods, food groups, recipes, users, or other suitable categories. Further, graphical cooking profiles may be organized into folders or in other suitable manners to facilitate later retrieval.

It will also be appreciated that sequence 130 may be timed to process tracing user input at different levels of granularity, e.g., to perform operation such as curve fitting, applying constraints, and generating events based upon different lengths of drawn lines. In some embodiments, for example, a user may draw a complete line representative of a graphical cooking profile before the drawn line is converted into a series of events for the graphical cooking profile.

Furthermore, as will be discussed in greater detail below, while some graphical cooking profiles may be stored locally in a cooking appliance and/or a user device, in other instances graphical cooking profiles may be shareable by multiple users, e.g., with friends, family or even posted publicly for retrieval by unknown users. Sharing of graphical cooking profiles via social media and the like may also be supported.

Figure 8:
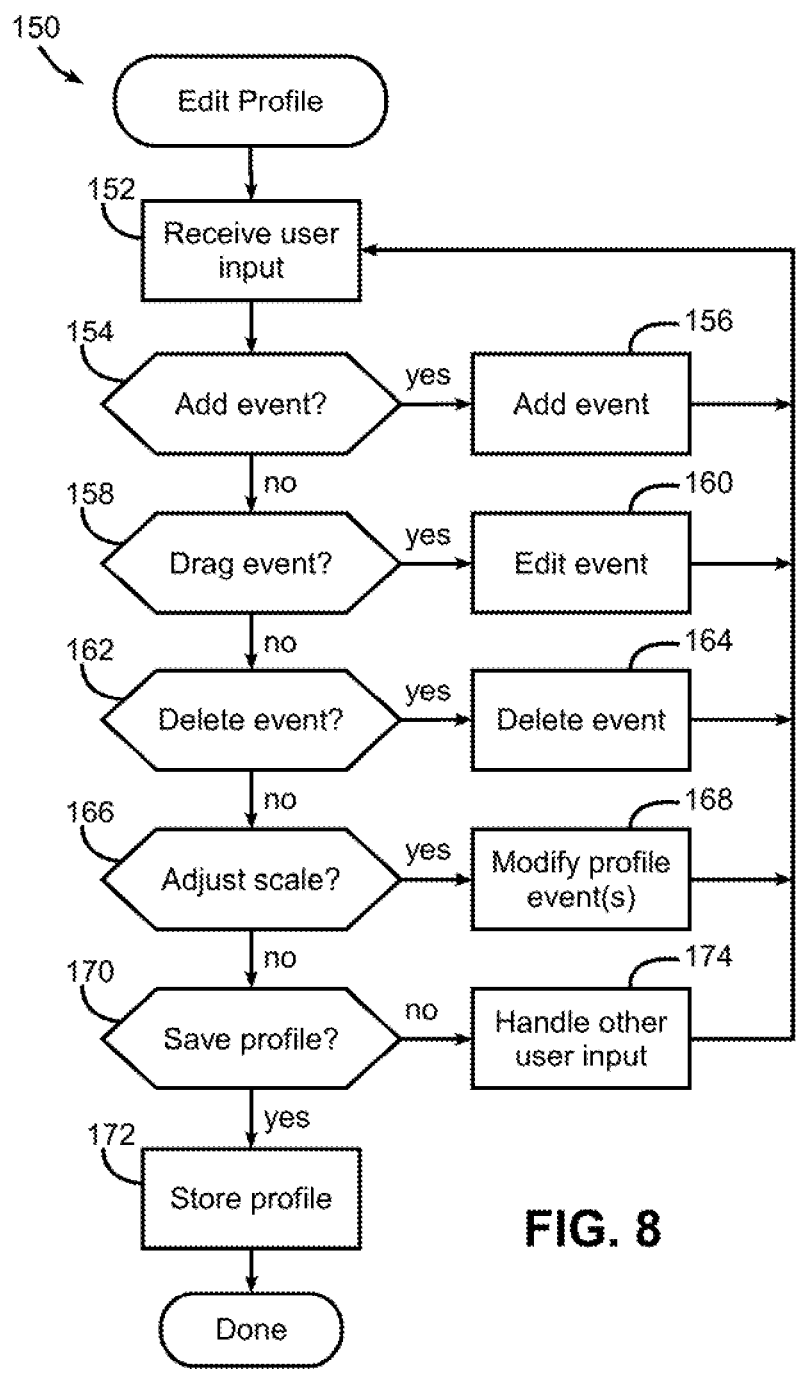
FIG. 8 is a flowchart illustrating an example sequence of operations for editing a graphical cooking profile using the cooking appliance of FIG. 2.

FIG. 8 next illustrates an example sequence of operations 150 for editing a graphical cooking profile. Sequence 150 may be called, for example, in response to a button or selection of a display element requesting editing or modification of a graphical cooking profile. For any user input received in block 152, blocks 154-172 generally determine the type of editing operation to be performed, and initiate performance of that operation. Block 154, for example, detects add event user input, which executes block 156 to add an event to the displayed graphical cooking profile, e.g., in the manner discussed above in connection with FIG. 5C. Block 158 detects a drag event, which drags a user control corresponding to an event to a different location on the display. A drag event executes block 160 to edit the selected event, e.g., in the manner discussed above in connection with FIG. 5B. Block 162 detects a delete event directed to a user control corresponding to an event, which executes block 164 to delete the selected event. Block 166 detects an attempt to adjust one or both scales of a time-energy graph, and executes block 168 to modify profile events as well as the display to display the graphical cooking profile based upon the scaled events.

Block 170 detects an attempt to store a graphical cooking profile, and executes block 172 to store the profile using the modified information therefor. Sequence 150 is then complete. Different user inputs, which provide additional modification as well as other operations that may not be of particular relevance to graphical cooking profiles, may be handled in block 174, and blocks 156, 160, 164, 168 and 174 each return control to block 152 upon completion in order to continue to receive user input while the graphical cooking profile is being edited.

Figure 9:
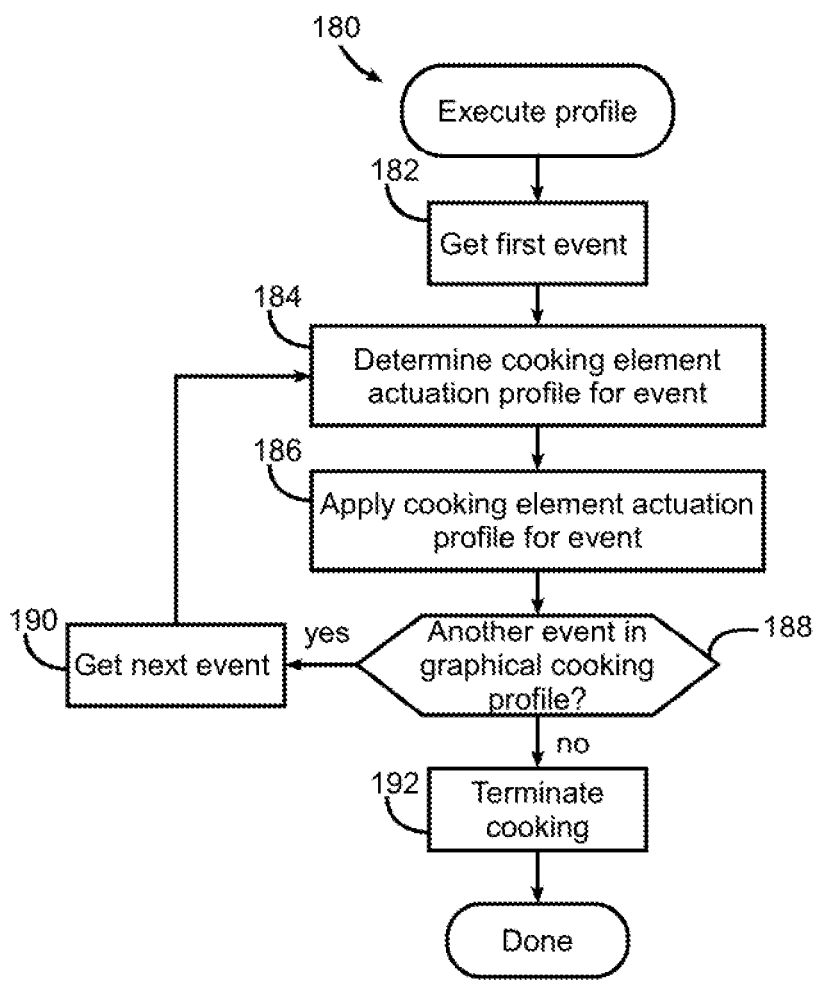
FIG. 9 is a flowchart illustrating an example sequence of operations for executing a graphical cooking profile using the cooking appliance of FIG. 2.

Now turning to FIG. 9, this figure illustrates an example sequence of operations 180 for executing a graphical cooking profile. In the illustrated embodiment, a graphical cooking profile is executed by processing each event of the graphical cooking profile sequentially and controlling one or more cooking elements of the cooking appliance accordingly. Sequence 180 may be initiated, for example, in response to user selection of a display representation of a graphical cooking profile from a displayed list, or after a search as is discussed below in connection with FIG. 10, among other manners.

Sequence 180 begins in block 182 by getting the first event for the graphical cooking profile, and then in block 184 by determining a cooking element actuation profile for the event. As noted above, a cooking element actuation profile controls how one or more cooking elements of a cooking appliance are actuated in response to an event. In some instances, a cooking element actuation profile may be as simple as setting a stovetop burner to medium high at a predetermined time or duration in a cooking cycle, while in other instances a cooking element actuation profile may control one or more cooking elements in advance of a time or duration associated with an event in order to reach a predetermined state at that time or duration, e.g., to begin controlling an oven cooking element 5 minutes before an event so that the oven transitions at a constant rate from a temperature of 300 degrees to 450 degrees. It will be appreciated that since the thermal load in an oven may vary for different foods, the rate at which the transition occurs may vary in different cooking cycles, and thus a cooking element actuation profile may incorporate temperature feedback in some instances.

Thus, in block 186 the cooking element actuation profile for the current event is applied, and then control passes to block 188 to determine if another event exists for the graphical cooking profile. If so, control passes to block 190 to get the next event, and then back to block 184 to handle the next event. Once all events have been processed, however, block 188 passes control to block 192 to terminate cooking, e.g., by turning off all cooking elements, and sequence 180 is complete.

Figure 10:
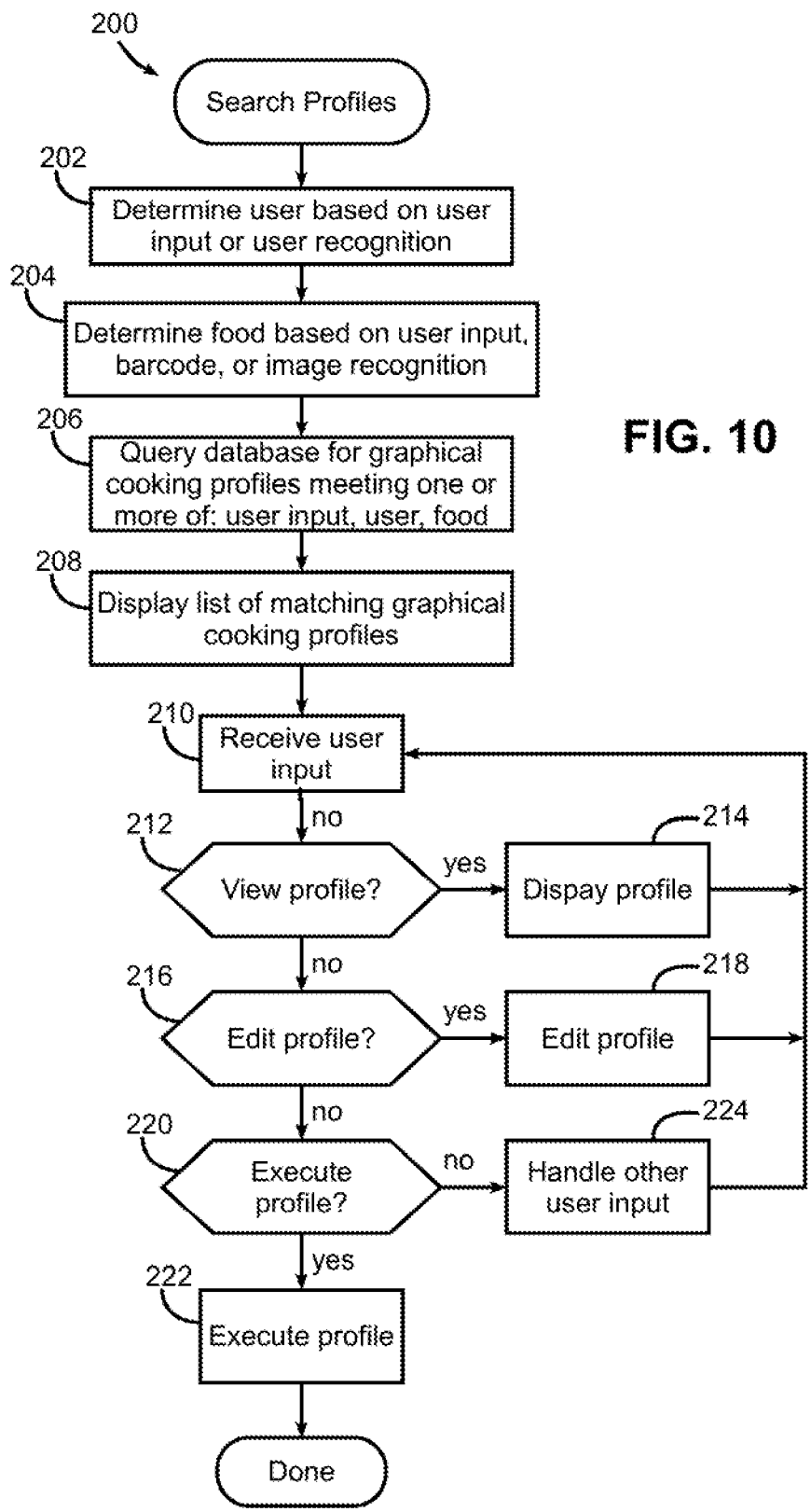
FIG. 10 is a flowchart illustrating an example sequence of operations for searching for graphical cooking profiles using the cooking appliance of FIG. 2.

FIG. 10 next illustrates an example sequence of operations 200 for searching for graphical cooking profiles. Sequence 200 may be initiated, for example, through user interaction with controller 42, e.g., from a button or touch input on a display, or via an external user device such as a smartphone, computer, table, personal digital assistant, etc.

Various manners defining search criteria for searching graphical cooking profiles may be supported in different embodiments, e.g., based on an identity of a user that created the graphical cooking profile, based upon a food, based upon a recipe, based on a food group, based on the cooking appliance model or type, based on tags, based on keywords, based on a name or identifier, or based on other user input or some combination of these criteria. Not all of these criteria may be supported in all embodiments, however, so it will be appreciated that some embodiments may only support one or more of these criteria or other criteria. Furthermore, as noted above, graphical cooking profiles may be shared in some embodiments, such that one user can search for, retrieve, and execute graphical cooking profiles created by another user or entity on a different cooking appliance altogether, while in other embodiments a user may only be permitted to search for, retrieve and execute graphical cooking profiles stored on his or her cooking appliance or user device. In addition, in some embodiments one or more "base" graphical cooking profiles may be stored in controller 42 or otherwise be accessible through a web site, social media, or the like, which base graphical cooking profiles may be provided by an appliance or food manufacturer or other entity. Further, user modifications to base graphical cooking profiles may also be supported, and in such instances, generally any modifications made by a particular user would result in the creation of a new graphical cooking profile.

In the illustrated embodiment of FIG. 10, however, multiple criteria may be supported, and thus sequence 200 begins in block 202 by attempting to determine the current identity of the user. In some embodiments, the determination may be based on user input, e.g., input of a user id, a display representation of a user, or in other suitable manners. In other embodiments user identification may be based on user recognition, e.g., via an image capture device or other biometric sensor. Block 204 next attempts to determine the food to be cooked, either based on user input (e.g., by drilling down through a hierarchical display of food groups, food types, recipes, and/or individual foods), or based on automatic detection such as via scanning a bar code or image recognition with an image capture device.

Next, block 206 queries a local and/or remote database for graphical cooking profiles meeting one or more criteria, e.g., user input (tags, keywords, etc.), user identity and/or food), and block 208 displays a list of display representations of graphical cooking profiles, e.g., the top X matches returned by the database. A user may then interact with the display representations, and as such, block 210 receives user input from a user.

If the user input requests to view a profile, e.g., based on a short touch directed to a display representation of a profile on a touch-sensitive display, block 212 passes control to block 214 to display the profile and/or information about the profile. If the user input requests to edit the profile, block 216 passes control to block 218 to edit the profile, e.g., using sequence 150 of FIG. 8. If the user input requests to execute the profile, block 220 passes control to block 222 to execute the profile, e.g., using sequence 180 of FIG. 9. Other user input may be handled in block 224, and upon completion of any of blocks 214, 218 and 224, control may be returned to block 210 to receive additional user input, while generally upon completion of block 222, sequence 200 terminates.

Additional modifications may be made in other embodiments. For example, image processing may be used in some instances to detect visual cues during the cooking of food (e.g. browning, boiling), and a graphical cooking profile may additionally incorporate events based on such visual cues. Some graphical cooking profiles may be generated after the fact, e.g., by tracking manual cooking element actuation during a cooking cycle are creating a profile based upon the tracked actuation. Notifications may be incorporated to alert a user, e.g., by text, email or the like, of the progress of a graphical cooking profile execution.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A residential cooking appliance, comprising:
   a housing;
   a cooking element configured to heat food disposed on a stovetop or in a cooking cavity enclosed by the housing;
   a touch-sensitive display disposed on the housing; and
   a controller coupled to the cooking element and the touch-sensitive display, the controller configured to:
      cause the touch-sensitive display to display a graph display that includes a substantially vertical axis corresponding to temperature or power level and a substantially horizontal axis corresponding to time;
      receive user input directed to the touch-sensitive display that traces a line onto the graph display;
      in response to the user input, progressively draw the traced line onto the graph display;
      in response to the user input, create a graphical cooking profile that varies applied cooking energy in the residential oven over a cooking cycle based at least in part upon the traced line, wherein the controller is configured to create the graphical cooking profile by generating a plurality of events based upon detected changes in slope in the traced line; and
      initiate the cooking cycle and vary the cooking energy applied over the cooking cycle according to the graphical cooking profile.

2. An apparatus, comprising:
   a user input device;
   a display;
   at least one processor coupled to the user input device to receive user input from the user input device and output display information to the display; and
   program code configured upon execution by the at least one processor to create, in response to tracing user input received by the user input device, a graphical cooking profile that varies applied cooking energy in a cooking appliance over a cooking cycle, and cause the display to display a graphical representation of the graphical cooking profile in a time-energy graph display that includes a two-dimensional plane with a first axis corresponding to energy and a second axis corresponding to time, wherein the program code is further configured to cause the cooking appliance to initiate the cooking cycle and vary the cooking energy applied by the cooking appliance over the cooking cycle according to the graphical cooking profile, and wherein at least a portion of the tracing user input extends in a direction in the two-dimensional plane that is oblique relative to each of the first and second axes to control a rate of change of applied cooking energy for a corresponding portion of the graphical cooking profile.

3. The apparatus of claim 2, wherein the display and the user input device are defined by a touch-sensitive display disposed on a control panel of the cooking appliance.

4. The apparatus of claim 2, wherein the display and the user input device are defined by a touch-sensitive display disposed on a computing device separate from the cooking appliance.

5. The apparatus of claim 4, wherein the computing device comprises a mobile device wirelessly networked with the cooking appliance.

6. The apparatus of claim 2, wherein the program code is configured to create the graphical cooking profile by generating a plurality of events based upon detected changes in slope in the tracing user input.

7. The apparatus of claim 2, wherein the program code is further configured to progressively overlay a sensed temperature of the cooking appliance onto the time-energy graph display during the cooking cycle.

8. The apparatus of claim 2, wherein the cooking appliance comprises an oven, a range, a stovetop, or a grill.

9. The apparatus of claim 2, wherein the tracing user input traces a line onto the display.

10. The apparatus of claim 9, wherein the program code is configured to cause the display to display the graphical representation of the graphical cooking profile by progressively drawing the graphical representation of the graphical cooking profile in response to the tracing user input.

11. The apparatus of claim 9, wherein the program code is configured to create the graphical cooking profile by applying curve fitting and/or applying one or more drawing constraints to generate one or more line segments for the traced line.

12. The apparatus of claim 11, wherein the one or more line segments includes a curved line segment.

13. The apparatus of claim 9, wherein the program code is configured to create the graphical cooking profile by creating a plurality of events for the graphical cooking profile, each event including a time value and an energy value corresponding to a portion of the traced line.

14. The apparatus of claim 2, wherein the program code is configured to cause the display to display the graphical representation of the graphical cooking profile further by displaying a time value and an energy value corresponding to a location of a current touch input on the time-energy graph display.

15. The apparatus of claim 2, wherein the program code is further configured to:
   receive user input that selects a location on the time-energy graph display; and
   add an event to the graphical cooking profile in response to the user input that selects the location, wherein the event includes a time value and an energy value corresponding to the selected location on the time-energy graph display, and wherein the program code is configured to cause the display to display the graphical representation of the graphical cooking profile by displaying a user control corresponding to the event on the time-energy graph display.

16. The apparatus of claim 15, wherein the program code is further configured to, in response to user input that drags the user control to a different location, update the time value and/or the energy value for the event to correspond to the different location.

17. The apparatus of claim 2, wherein the first axis of the time-energy graph display is a substantially vertical axis and the second axis of the time-energy graph display is a substantially horizontal axis.

18. The apparatus of claim 17, wherein the first axis represents temperature or power level.

19. The apparatus of claim 18, wherein the graphical representation of the graphical cooking profile includes a line graph or a bar graph.

20. The apparatus of claim 2, wherein the program code is further configured to:
adjust a scale of one of the first and second axes in response to user input; and
modify the graphical cooking profile based upon the adjusted scale.

21. The apparatus of claim 2, wherein the program code is further configured to:
store the graphical cooking profile in a database;
retrieve the graphical cooking profile in response to future user input; and
initiate execution of a cooking cycle using the retrieved graphical cooking profile.

22. The apparatus of claim 21, wherein the tracing user input and the future user input are received from the same user, and wherein the program code is configured to initiate the cooking cycle by initiating the cooking cycle on the cooking appliance.

23. The apparatus of claim 21, wherein the future user input is received from a different user than from which the tracing user input is received, and wherein the program code is configured to initiate the cooking cycle by initiating the cooking cycle on a different cooking appliance.

24. The apparatus of claim 21, wherein the program code is further configured to:
retrieve one or more previously-created graphical cooking profiles meeting a criterion; and
display representations of the one or more previously-created graphical cooking profiles on the display, wherein the program code is configured to retrieve the graphical cooking profile in response to user selection of a display representation of the graphical cooking profile on the display.

25. The apparatus of claim 24, wherein the criterion is based on a food to be cooked such that the one or more previously-created graphical cooking profiles are associated with the food to be cooked.

26. The apparatus of claim 25, wherein the program code is further configured to automatically detect the food to be cooked.

27. The apparatus of claim 24, wherein the criterion is based on an identity of a user of the cooking appliance.

28. The apparatus of claim 2, wherein the user input device is an image capture device, and wherein the tracing user input includes a gesture.

29. The apparatus of claim 2, wherein the user input device is an audio input device, and wherein the tracing user input includes voice input.

30. An apparatus, comprising:
a touch-sensitive display;
at least one processor coupled to the touch-sensitive display to receive user input and output display information to the touch-sensitive display; and
program code configured upon execution by the at least one processor to:
in response to user input received by the touch-sensitive display, create a graphical profile that varies applied cooking energy in a cooking appliance over a cooking cycle;
cause the touch-sensitive display to display a graphical representation of the graphical cooking profile in a time-energy graph display that includes a two-dimensional plane with a first axis corresponding to energy and a second axis corresponding to time; and
cause the cooking appliance to initiate the cooking cycle and vary the cooking energy applied by the cooking appliance over the cooking cycle according to the graphical cooking profile;
wherein at least a portion of the display representation of the graphical profile created in response to the user input extends in a direction in the two-dimensional plane that is oblique relative to each of the first and second axes to control a rate of change of applied cooking energy for a corresponding portion of the graphical cooking profile.

31. The apparatus of claim 30, wherein the user input selects a location on the time-energy graph display, wherein the program code is configured to create the graphical cooking profile by adding an event to the graphical cooking profile in response to the user input that selects the location, wherein the event includes a time value and an energy value corresponding to the selected location on the time-energy graph display, and wherein the program code is configured to cause the touch-sensitive display to display the graphical representation of the graphical cooking profile by displaying a user control corresponding to the event on the time-energy graph display.

32. The apparatus of claim 31, wherein the program code is further configured to, in response to user input that drags the user control to a different location, update the time value and/or the energy value for the event to correspond to the different location.

33. An apparatus, comprising:
a touch-sensitive display;
at least one processor coupled to the touch-sensitive display to receive user input and output display information to the touch-sensitive display; and
program code configured upon execution by the at least one processor to:
cause the touch-sensitive display to display a graphical representation of a graphical cooking profile that varies applied cooking energy in a cooking appliance over a cooking cycle in a time-energy graph display that includes a two-dimensional plane with a first axis corresponding to energy and a second axis corresponding to time;
in response to user input received by the touch-sensitive display, modify the graphical cooking profile;
cause the touch-sensitive display to display an updated graphical representation of the graphical cooking profile in the time-energy graph display; and
cause the cooking appliance to initiate the cooking cycle and vary the cooking energy applied by the cooking appliance over the cooking cycle according to the modified graphical cooking profile;
wherein at least a portion of the updated graphical representation of the graphical cooking profile modified in response to the user input extends in a direction in the two-dimensional plane that is oblique relative to each of the first and second axes to control a rate of change of applied cooking energy for a corresponding portion of the graphical cooking profile.

34. The apparatus of claim 33, wherein the program code is configured to cause the touch-sensitive display to display the graphical representation of the graphical cooking profile by causing the touch-sensitive display to display a user control corresponding to an event of the graphical cooking profile on the time-energy graph display, wherein the user input includes user input that drags the user control to a different location, and wherein the program code is configured to modify the graphical cooking profile by updating a time value and/or an energy value for the event.

35. The apparatus of claim 33, wherein the graphical cooking profile is a base graphical cooking profile associated with a food.

36. The apparatus of claim 35, wherein the program code is further configured to automatically detect the food, and wherein the program code is configured to cause the touch-sensitive display to display the graphical representation in response to automatically detecting the food.

\* \* \* \* \*